(12) United States Patent
Schild (10) Patent No.: US 10,490,079 B2
(45) Date of Patent: Nov. 26, 2019

(54) METHOD AND DEVICE FOR SELECTING AND TRANSMITTING SENSOR DATA FROM A FIRST MOTOR VEHICLE TO A SECOND MOTOR VEHICLE

(71) Applicant: Continental Automotive GmbH, Hannover (DE)

(72) Inventor: Bernhard Schild, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/773,072

(22) PCT Filed: Nov. 1, 2016

(86) PCT No.: PCT/EP2016/076288
§ 371 (c)(1),
(2) Date: May 2, 2018

(87) PCT Pub. No.: WO2017/076827
PCT Pub. Date: May 11, 2017

(65) Prior Publication Data
US 2018/0322784 A1 Nov. 8, 2018

(30) Foreign Application Priority Data
Nov. 2, 2015 (DE) .......... 10 2015 221 439

(51) Int. Cl.
*G08G 1/00* (2006.01)
*G08G 1/16* (2006.01)
(Continued)

(52) U.S. Cl.
CPC .............. *G08G 1/162* (2013.01); *G01S 7/003* (2013.01); *G01S 7/4026* (2013.01);
(Continued)

(58) Field of Classification Search
CPC ........ G08G 1/162; G08G 1/166; G01S 7/003; G01S 7/006; G01S 7/4026; G01S 13/931;
(Continued)

(56) References Cited

U.S. PATENT DOCUMENTS 6,456,904 B1 * 9/2002 Gay ............... G09B 19/167
104/140
7,466,992 B1 * 12/2008 Fujisaki ......... H04M 1/274516
455/556.1
(Continued)

FOREIGN PATENT DOCUMENTS

DE 19914906 A1 10/2000
DE 102006055344 A1 5/2008
(Continued)

OTHER PUBLICATIONS

International Search Report and Written Opinion dated Feb. 10, 2017 from corresponding International Patent Application No. PCT/EP2016/076288.
(Continued)

*Primary Examiner* — Kerri L McNally
*Assistant Examiner* — Thang D Tran (57) ABSTRACT

A method for depicting sensor data of one or more first motor vehicle(s) via a man-machine interface of a second motor vehicle comprises depicting an image of at least part of surroundings of the second motor vehicle via the man-machine interface of the second motor vehicle. One or more first motor vehicle(s) in the surroundings is/are mapped at least in part. A user selects one or more of the mapped first motor vehicles to which respective point-to-point connections are set up that are used to send a request for information pertaining to available sensors and the properties thereof. Based on the responses, a schematic depiction of the surroundings of the second motor vehicle is created and reproduced that shows positions of the motor vehicles in the
(Continued)

surroundings, the sensors available in the motor vehicles and areas within which the available sensors can pick up objects.

18 Claims, 6 Drawing Sheets

(51) Int. Cl.
  *G01S 13/93* (2006.01)
  *G01S 7/00* (2006.01)
  *G01S 7/40* (2006.01)
(52) U.S. Cl.
  CPC ............ *G01S 13/931* (2013.01); *G08G 1/166* (2013.01); *G01S 2013/936* (2013.01); *G01S 2013/9364* (2013.01); *G01S 2013/9367* (2013.01)
(58) Field of Classification Search
  CPC ........ G01S 17/936; G01S 1/163; G01S 1/166; G01S 2013/936; G01S 2013/9364; G01S 2013/9367
  USPC .......................................................... 340/902
  See application file for complete search history.

(56) References Cited

U.S. PATENT DOCUMENTS

| | | | | |
|---|---|---|---|---|
| 8,885,039 B2* | 11/2014 | Jang | ...................... | G01C 21/36 340/436 |
| 8,939,839 B2* | 1/2015 | Cash | ...................... | H04L 67/38 463/40 |
| 9,188,980 B2 | 11/2015 | Anderson | | |
| 2002/0198660 A1* | 12/2002 | Lutter | ................... | G08G 1/0965 701/301 |
| 2003/0098800 A1* | 5/2003 | Jambhekar | ............... | G08G 1/01 340/901 |
| 2003/0139881 A1* | 7/2003 | Miller | ................... | B60R 21/013 701/301 |
| 2006/0181431 A1* | 8/2006 | Konishi | ................ | B60W 40/04 340/903 |
| 2008/0040023 A1* | 2/2008 | Breed | ................... | B60N 2/2863 701/117 |
| 2008/0133136 A1* | 6/2008 | Breed | ................... | B60N 2/2863 701/301 |
| 2008/0265097 A1* | 10/2008 | Stecko | ................... | B64D 39/00 244/135 A |
| 2009/0231432 A1* | 9/2009 | Grigsy | ................... | G08G 1/161 348/149 |
| 2012/0052870 A1 | 3/2012 | Habicher | | |
| 2013/0342368 A1* | 12/2013 | Nathanson | ............. | G07C 5/008 340/903 |
| 2014/0009307 A1* | 1/2014 | Bowers | .................. | G08G 1/161 340/901 |
| 2014/0019005 A1* | 1/2014 | Lee | ......................... | G08G 1/166 701/36 |
| 2014/0152774 A1* | 6/2014 | Wakabayashi | ......... | G08G 1/168 348/46 |
| 2015/0016823 A1* | 1/2015 | Strassenburg-Kleciak | ................. | H04B 10/1143 398/115 |
| 2015/0112800 A1* | 4/2015 | Binion | ............... | G06Q 30/0255 705/14.53 |
| 2015/0127191 A1* | 5/2015 | Misra | ................... | G08G 1/0112 701/1 |
| 2015/0145995 A1* | 5/2015 | Shahraray | ............... | H04W 4/70 348/148 |
| 2015/0155007 A1* | 6/2015 | Barfield, Jr. | ............ | G06T 15/20 386/278 |
| 2015/0235538 A1* | 8/2015 | Konigsberg | ............. | A61B 5/18 340/439 |
| 2015/0317834 A1* | 11/2015 | Poulos | .................... | G06F 3/012 345/619 |
| 2016/0232423 A1* | 8/2016 | Zhong | ...................... | G06K 9/52 |
| 2016/0277601 A1* | 9/2016 | Seymour | .................. | H04N 7/181 |
| 2017/0010174 A1* | 1/2017 | Melen | .................. | B62D 15/025 |
| 2019/0001987 A1* | 1/2019 | Kim | ..................... | B60W 50/00 |

FOREIGN PATENT DOCUMENTS

| | | |
|---|---|---|
| DE | 102008042565 A1 | 4/2010 |
| EP | 2122598 B1 | 4/2013 |
| EP | 2693230 A1 | 2/2014 |

OTHER PUBLICATIONS

Office Action dated Sep. 5, 2016 from corresponding German Patent Application No. 10 2015 221 439.7.

* cited by examiner

METHOD AND DEVICE FOR SELECTING AND TRANSMITTING SENSOR DATA FROM A FIRST MOTOR VEHICLE TO A SECOND MOTOR VEHICLE

BACKGROUND

Field of the Art

The present invention relates to a method for wirelessly transmitting sensor data between vehicles and to an applicable apparatus.

Background

Wireless communication networks are employed in a multiplicity of technical fields of application today. In the area of automotive engineering, it is known that vehicles use what is known as car-to-car communication to exchange information with one another. This communication is a wireless ad hoc network that is set up between physically adjacent vehicles in road traffic and, from a technical point of view, involves an evolved WLAN (wireless local area network) network based on the IEEE 802.11 standard.

In the area of car-to-car communication, a wireless radio link between vehicles is used to transmit the information ascertained by the sensor system of one vehicle to other vehicles in physical proximity, for example. This allows in particular information regarding hazard spots to be quickly transmitted from one vehicle to other vehicles. However, this method does not involve the vehicle that wirelessly receives this information specifying which vehicle is supposed to receive particular information. Moreover, the transmitted data are of abstract nature and contain little detail. The methods known from the prior art are therefore not suitable for discriminatory information transmission from one vehicle to the other, and no transmission of detailed data is offered that is suitable for assisting a driver directly in a traffic situation that is difficult to see. In particular, the car-to-car communication architectures known to date, which e.g. also resort to mobile radio networks, cannot guarantee sufficiently low latencies, for example in the single millisecond range, for the telecommunication. Further, the approach shown here permits authentication for the sender that is based inter alia on conventional methods of radio direction finding. This authentication is not possible as precisely for other car-to-car communication methods such as WiFi and Bluetooth or DSRC, because the transmitters thereof cannot be oriented as exactly to a point in three-dimensional space as in the case of the approach described here. Further, the sensor functionality of the AESA radar can be used here to perform distance measurements from a receiving second vehicle to a sending first vehicle for monitoring purposes more or less in parallel with the communication process. Therefore, fast error detection is possible for this type of communication link in the single millisecond range. This cannot be achieved in this way by other types of car-to-car communication.

Embedding of single functionalities presented here into an ADASIS architecture would be possible in principle, but is not pursued further in the descriptions that follow. Further, it would also be possible to imagine uses of e.g. DSRC and WLAN ITS-g5. The example solution proposed here for the communication using an AESA radar meets requirements in terms of latency, reliability and authentication, however, that are still under discussion for other methods or cannot be achieved on principle. Therefore, references to these concepts are dispensed with in the depictions that follow.

DE 10 2006 055 344 A1 shows the use of data about the traffic situation in the surroundings of a first vehicle in a second vehicle that is relatively close to the first vehicle. In this case, the data received in the second vehicle are output at least in part via an output means so as to be perceptible to the driver of said vehicle. After selective identification of the first vehicle, the data of this vehicle that are directly relevant to the driver of the first vehicle are received in discriminatory fashion. In D1, the first vehicle is identified by registration or numberplate recognition by means of a camera or through the interchange of geoposition data. The received data comprise inter alia a video image recorded by a camera provided in the first vehicle or abstracted data such as a distance between the first vehicle and a vehicle traveling ahead or distance and speed of an oncoming vehicle, for example.

DE 199 14 906 A1 discloses a communication system for discriminatory communication between vehicles driven independently of one another that allows exact addressing by virtue of orientation of a communication device and matching of a communication range to the position of a vehicle with which it is desirable to begin communication.

Explanations of Terms

The term position equates with a whereabouts on the earth's surface or in or on a construction provided or suitable for road traffic. Depending on the context, a position can also denote the representation of a whereabouts on a map or roadmap.

Within the context of this description, a motor vehicle is a motor-driven vehicle running on the earth's surface or in or on structures connected thereto.

In this description, the term traffic space equates with a surface on which vehicles, moving or unmoving, participate in the traffic. In this case, the traffic space can also extend in different planes, for example in the case of bridges or underpasses. Unless indicated otherwise, the term traffic space within the context of this description denotes immediate surroundings of a motor vehicle, the included radius also being able to be dependent on the speed of travel of the motor vehicle and the complexity of the traffic space. In particular, the traffic space can have an irregular shape with a different extent in different directions, for example a rectangle that has a longer extent in the direction of travel of the motor vehicle than to the sides or behind.

The statement "relative to a vehicle" equates in this description with a direction and/or distance in relation to a vehicle. In this case, a standard placement is provided on an area around the vehicle either in degrees, 0 degrees being at the front and 180 degrees being at the rear, or based on a dial of a clock in hours and possibly minutes. In the latter case, 12 o'clock equates with at the front and 6 o'clock equates with at the rear.

The term orientation equates with an orientation of a vehicle in the traffic space, the orientation being oriented to a front or to a rear of a vehicle. In this case, it is assumed that the front of a vehicle is also referenced by "at the front" and the rear of a vehicle is also referenced as "at the rear".

The term "azimuth" describes a horizontal orientation of a sensor, for example a swivel to the left or right from a zero position determined by the installation location and the installation position of the sensor, or a horizontal swivel oriented to an absolute zero reference, for example to the direction of the north pole of the earth as seen from a current location. Accordingly, the term "elevation" describes a vertical orientation of a sensor, for example an angle between the horizon and the direction of the sensor.

Together with the determinations of distance that are standard for radar measurements, it is in particular possible for AESA radars to be used to perform three-dimensional scans of spatial sectors by virtue of e.g. electronic beam sweeping being used to vary the scanning radar beam. Radar imaging techniques such as SAR, ISAR, etc. that have already been known for years are not discussed further at this juncture.

"Lidar" is the abbreviation for the English term "light detection and ranging". Lidar is a method of optical distance and speed measurement related to radar (radio detection and ranging). Instead of radio waves, beams of light, in particular laser beams, are used. To pick up an area, the beam of light is moved in defined fashion over the area, in similar fashion to the line-by-line scanning in a cathode-ray tube television set, the scanning in the case of lidar being effected by means of one or more mobile mirror(s).

Using an AESA radar, electronic beam sweeping can also be used to create three-dimensional scans of selected parts of the visible vehicle surroundings that can then be conditioned in an imaging process to produce a visible depiction. This involves, in general, a data fusion with other available sensor data, e.g. also from optical systems such as cameras, being carried out beforehand and data cleansing, e.g. by means of Kalman filtering, being performed for collation purposes.

Technical Problem

It is an object of the invention to provide a method and an apparatus for wireless communication between vehicles that offer more efficient assistance to the driver of a motor vehicle in a traffic situation that is difficult to see.

BRIEF SUMMARY

Technical Solution

This object is achieved by the independent patent claims. Refinements of the invention are defined in the dependent claims.

A method according to the invention for depicting sensor data of a first motor vehicle via a man-machine interface of a second motor vehicle involves an image of at least part of surroundings of the second motor vehicle being recorded and being reproduced via the man-machine interface of the second motor vehicle. One or more first motor vehicle(s) is/are mapped at least in part on the image of the surroundings. The display is provided on a screen arranged in the field of view of the driver, for example. The display can also be provided such that respective positions and orientations of the first motor vehicles in the traffic space relative to the second motor vehicle are schematically depicted. The determination of the positions and orientations of the first motor vehicles in the traffic space relative to the second motor vehicle can be carried out particularly easily when a stereo camera system is used. A suitable piece of object-detection software can be used in particular to identify other motor vehicles, which are then assigned applicable coordinates in a three-dimensional space. The object detection also allows silhouettes corresponding to the objects identified as a motor vehicle to be determined.

A driver or operator selects one or more of the first motor vehicles from which sensor data are supposed to be received. The selection can be made by touching a respective motor vehicle on a touch-sensitive screen on which the image of the surroundings is reproduced, for example. If gesture detection is available, the selection can also be made by pointing to one or more first motor vehicle(s) depicted on a screen as applicable. Other selection methods, for example by placing a cursor on or close to a motor vehicle depicted on the screen, are likewise conceivable, the cursor being able to be controlled in a fundamentally known manner.

After a selection has been made, one or more individual first point-to-point connection(s) from the second to the selected first motor vehicle(s) is/are set up via a first wireless communication interface. In this case, the one or more first motor vehicle(s) can be identified using registration recognition, for example. Expediently, in this case the registration is at the same time an identification for setup of a connection. However, it is also possible for motor vehicles to periodically emit identification signals that can be received by other motor vehicles and used for setting up a connection.

The one or more individual first point-to-point connection(s) can be set up after applicable orientation of a first transmission or reception apparatus in the direction of the applicable one or more first motor vehicle(s), for example. The first transmission or reception apparatus can be oriented on the basis of angles of azimuth and elevation for the selected first motor vehicle(s) that are ascertained from the image of the surroundings of the second motor vehicle beforehand, for example. As such, if the point that the driver or operator has selected on the screen comes under the silhouette of a motor vehicle, it is possible for the applicable angles for orienting the first transmission or reception apparatus to be determined from the known position of the second motor vehicle and the known properties of the camera that was used to record the image of the surroundings of the second motor vehicle. Optionally, e.g. when radar is used, the identity of the thus selected vehicle for the currently measured distance can additionally be plausibilized taking into consideration the azimuth and elevation values. If the installation locations for radar systems or lidar systems in motor vehicles are standardised, for example always centrally between the headlamps of the motor vehicles, then the object detection described above can be used to set the location to which the transmission or reception apparatus is oriented correspondingly more accurately. The setup of point-to-point connections using oriented transmission and reception apparatuses allows the use of other identification features for setup of a connection to be dispensed with. In particular, when an AESA radar is used, the beamforming to set up an optimal radio link from the respective vehicles, for example the first vehicles, to the addressed other vehicles, for example the second vehicles, can be oriented such that only the addressed vehicles react to the setup of the point-to-point connection and those unaffected ignore it. To this end, a vehicle accepts reception of electromagnetic waves from a vehicle only if they are directed from the sending vehicle to the receiving vehicle and the receiving vehicle also expects a transmission from the sending vehicle. This can be verified using conventional radio direction finding/radio locating means.

After the one or more individual first point-to-point connection(s) has/have been set up, a request to transmit information pertaining to available sensors and the properties thereof to the second motor vehicle is transmitted to the selected first motor vehicle(s).

In response to the request, the second motor vehicle receives responses from one or more of the selected first motor vehicles via the respective first point-to-point connections and reproduces a schematic depiction of the surroundings of the second motor vehicle, wherein the schematic depiction shows positions of the second and the one or more first motor vehicle(s) in the surroundings of the second motor vehicle, and wherein the schematic depiction depicts areas within which the sensors of the one or more first motor vehicle(s) and/or of the second motor vehicle can pick up objects. These areas may be denoted in colour or by an applicable texture in the schematic depiction, for example. The schematic depiction of the surroundings can moreover show objects that are located in the surroundings of the second motor vehicle and/or in the respective surroundings of the one or more first motor vehicle(s). The objects include, inter alia, boundaries of roads, houses and the like, but also other objects located in the traffic space that have been picked up by sensors.

The man-machine interface of the second motor vehicle receives a user input that corresponds to a selection of one or more of the motor vehicles, or the sensors thereof, shown in the schematic depiction and of an area to be picked up by the selected sensor(s) and sends an applicable request to one or more first motor vehicle(s) whose sensors can pick up the area to be picked up. If an area to be picked up in the schematic depiction can be picked up only by sensors of one of the one or more first motor vehicle(s), the request is also sent only to this one first motor vehicle. Otherwise, the request can be sent to all first motor vehicles whose sensors can pick up the area to be picked up. The request to pick up an area can include information pertaining to the azimuth and elevation of a sensor, either from the point of view of the second motor vehicle or from the point of view of the respective first motor vehicle whose sensor is supposed to pick up the area. The selection of an area to be picked up by a sensor, in particular the narrowing-down of an area to be picked up, causes a decrease in the volume of the data to be transmitted, which allows faster reproduction of the sensor data in the second motor vehicle to take place.

The first motor vehicle(s) having received a request to pick up an area perform(s) applicable sensor measurements and transmit(s) the measurement results to the second motor vehicle. In the simplest case, the measurement result reported is the presence of an object in the picked-up area and the coordinates thereof or, if an object has not been detected, an applicable report that an object has not been detected. In embodiments of the method according to the invention, further information about detected objects can be reported, for example the dimensions or contours thereof and, if multiple measurements have been carried out cyclically in succession, whether and in what direction detected objects move.

The corresponding system in the second motor vehicle receives the sensor data sent by the one or more first motor vehicle(s) in response to the request and reproduces them via the man-machine interface of the second motor vehicle. If sensor data have been received from multiple first motor vehicles, they are reproduced jointly, if need be after an applicable data fusion. If a measurement has not been carried out, this "nonevent" is also reproduced as applicable. In addition to a visual reproduction, an audible signal can be reproduced for each measurement, different audible signals also being able to be used for detected objects and non-detection of objects. Similarly, haptic feedback can be used to signal the measurement results. By way of example, if a finger of an operator or driver of the second motor vehicle remains on a touch-sensitive screen while the measurement is carried out by the first vehicle(s), an applicable vibration can signal the presence of an object in the area to be picked up selected by the position of the finger. Dispensing with time-consuming production of a visual depiction from the measurement data of the sensor(s) of the first motor vehicle(s) results in faster feedback in this case.

Instead of the split into a first request to ascertain which sensors are able to pick up which area and a second request with the specific pickup order, it is also possible for a single request with a specific pickup order to be sent directly. If pickup according to the desired specifications is not possible, the pickup order is in this case either not carried out or pickup that complies with the specifications of the order in the best possible way is performed.

In one configuration of the invention, the measurement by the sensor(s) of the first motor vehicle(s) is repeated cyclically and the measurement results are transmitted and updated as applicable on the reproduction by the man-machine interface of the second motor vehicle. The time intervals in which the measurement is repeated may be settable by a user or adjusted automatically in this case. Automatic adjustment is possible on the basis of the current speed of the first or the second motor vehicle, for example.

In one configuration of the method according to the invention, the request is sent to the selected first motor vehicle(s) via respective individual first point-to-point connections that are set up via the first wireless communication interface. The responses are received by a respective second point-to-point connection that is set up via a second wireless communication interface. By way of example, the first wireless communication interface operates on the basis of the IEEE 802.11 standard, and point-to-point connections set up via it are logical point-to-point connections. The second wireless communication interface uses a radar system or lidar system provided in the first and the one or more second vehicle(s), for example, and point-to-point connections set up via it are physical point-to-point connections that involve transmitter and receiver communicating with one another using a focused radar beam or beam of light oriented between transmitter and receiver. The communication using a focused radar beam oriented between transmitter and receiver is known from military aviation. In this case, radar systems having active electronic beam sweeping and aperture control also known as active phased-array radar or an active electronically scanned array (AESA) are used, which are based on semiconductor chips, and therefore can also be used in the automotive sector. The introduction of the AESA in military aviation resulted in one and the same radar appliance being able to be used to carry out different orders in parallel that had previously been handled by separate appliances. Therefore, a single AESA radar can be used to handle different sensor and communication tasks (virtually) in parallel, virtually in parallel here meaning that the tasks alternate within short successive timeslots. In the present application in the automotive sector, this means in particular that when an AESA radar is used it is fundamentally possible for externally initiated sensor tasks to be carried out (virtually) in parallel. Further, applicable beamforming allows the functionality of a wideband radio link, directed to a selected communication partner, to be set up on an ad hoc basis. This radio link needs to exist only for a short timeslot in each case so that the AESA radar is available for other tasks, e.g. own or other sensor tasks, again in the next one. Applicable communication using a beam of light, in particular using a laser beam, can be effected using an optical scanner provided in a vehicle, which scanner is oriented to an applicable receiver in the other vehicle. It is naturally also possible for the whole communication to be handled via a communication interface.

If the AESA radar is oriented to the receiving vehicle to transmit sensor data from the sending vehicle using beamforming as in a radio link, the receiving vehicle can authenticate the source, i.e. the transmitter of the sensor data, using conventional means of radio direction finding/radio locating in geometric fashion, i.e. taking into consideration azimuth, elevation and distance, taking into consideration the visibility thereof for the original selection of the vehicles. Further, in the case of distance measurement conducted virtually in parallel, it is also possible for an interruption in this "radio link" to be picked up immediately, that is to say to ensure error detection in the single millisecond range. For verification purposes, the sensor pickup by the first vehicle can periodically be temporarily directed by the second vehicle to areas of the traffic space that are able to be picked up jointly, in order to check correct functionality. A second vehicle can thus persistently periodically run a diagnosis of the sensors used in a first vehicle.

These security characteristics, such as authentication and fast error detection, needed for the transfer of sensor data cannot be provided by other car-to-car communication methods.

In one embodiment of the above-described configuration of the method according to the invention, sensor data are transmitted between the vehicles by means of an EASA radar. Instead of radar data, however, it is also possible for live images from a video camera arranged in the first vehicle to be transmitted to the second vehicle. The high bandwidth that the data transmission via a directional radar beam provides allows almost latency-free transmission of sensor data, e.g. video image transmission of even uncompressed video signals. In this case, the transmission of uncompressed video signals has the advantage that latency owing to compression disappears. The direct transmission of sensor data without any preprocessing from a first vehicle to a second vehicle then also allows processing of these data in e.g. the ADAS system of the second vehicle with controllable, low latencies for the capture of said data. Therefore, these are more trustworthy than events reported by car-to-car, it even being possible for a data fusion with the data reported by local sensors to be effected. The driver of the second vehicle can therefore obtain an overview of the traffic situation from the point of view of the first vehicle in real time. In addition to the video image, data ascertained by the radar system of the first vehicle pertaining to objects in the coverage area of the radar system of the first vehicle can be transmitted and can be reproduced together with the video image. Additional information comprises inter alia distance information between the object and the second vehicle and also the speed and direction of movement of the object, if present, measured in the first vehicle.

Otherwise, the real-time transmission of the image content (visual data or scan results e.g. from radar sensors) and of other sensor data allows a data fusion to be effected in the e.g. ADAS system of a second vehicle for local and remote sensor data. This means that inter alia e.g. Kalman filtering methods can be used to make improved predictions about the behavior of precisely those objects, for example vehicles, pedestrians, etc., that have left the scan area of the vehicle's own sensors, possibly even only for a short time. Such a prediction can be transmitted to the driver, e.g. visually in the form of augmented reality.

In one embodiment of the method according to the invention, if a first motor vehicle leaves a coverage area of the second motor vehicle or if communication between the two vehicles is no longer possible, the display of the man-machine interface is updated accordingly. In this case, it is possible for not only a symbol representing the first motor vehicle but also measurement results of the measurements carried out by this motor vehicle to be removed. The update can be effected directly or after a waiting time has elapsed.

An apparatus provided in a second motor vehicle for carrying out the method according to the invention comprises at least one sensor that is configured to detect one or more first motor vehicle(s) in the surroundings. By way of example, the sensor is a camera arrangement that is connected to an applicable device for object detection. The apparatus moreover comprises a first and optionally a second communication interface via which one or more point-to-point connection(s) to one or more first motor vehicle(s) can be set up. Furthermore, the apparatus comprises a man-machine interface that is configured to reproduce sensor measurement results delivered by vehicle-based sensors and by other motor vehicles. In this case, the man-machine interface is also configured to accept user inputs. The apparatus or single components thereof has/have one or more microprocessor(s) that is/are connected to volatile or nonvolatile memory means. The one or more microprocessor(s) in this case execute(s) computer program instructions that are preferably stored in the nonvolatile memory means, and the execution of which causes the implementation of single or multiple steps of the method according to the invention.

An apparatus provided in a first motor vehicle for carrying out the method according to the invention comprises at least one sensor that is configured to pick up objects in the surroundings of the first motor vehicle. By way of example, the sensor is a camera arrangement that may be connected to an applicable device for object detection. Other suitable sensors are radar sensors, ultrasonic sensors, laser sensors and the like, for example. The apparatus provided in the first motor vehicle moreover comprises a first and optionally a second communication interface via which a point-to-point connection to a second motor vehicle can be set up. The apparatus furthermore comprises a control unit that evaluates and executes demands for sensor measurements coming from a second motor vehicle and triggers the transmission of the sensor measurement results to the second motor vehicle. The apparatus or single components thereof has/have one or more microprocessor(s) that are connected to volatile or nonvolatile memory means. The one or more microprocessor(s) in this case execute(s) computer program instructions that are preferably stored in the nonvolatile memory means, and the execution of which causes the implementation of single or multiple steps of the method according to the invention.

The present invention allows a driver of a vehicle to access sensor systems of other vehicles in the surroundings and to obtain information even pertaining to objects that are not in the visual range of the driver or of the sensor systems of his vehicle. The bidirectional, almost latency-free point-to-point communication furthermore allows sensor systems of other vehicles to be selectively accessed and the coverage areas thereof to be controlled such that information pertaining to particular selected areas of the surroundings of the vehicle is obtained in discriminatory fashion. The selective active access to sensor systems of other vehicles means that the driver of the vehicle no longer has to rely on transmission intervals of the other vehicles that they use to broadcast possibly selected information pertaining to their respective surroundings to all receivers in the surroundings, as provided for in car-to-car communication.

Further, the method for sending sensor data via an AESA radar from a first vehicle to a second vehicle using beamforming as directional radio presents a method that allows sufficiently low latency for the transmission and error detection, secure authentication and identification, which is indispensable for the use of external sensor data from a first vehicle in a second vehicle. If the second vehicle now also performs diagnoses for the sensor functionality in the first vehicle, e.g. when picking up common parts of the traffic space, with the necessary frequency, this communication link from a first vehicle to a second vehicle has sufficient reliability for use for ADAS purposes in a second vehicle.

BRIEF DESCRIPTION OF THE DRAWINGS

The invention is described below on the basis of the figures in the drawing.

In the figures, the same or similar elements are provided with the same reference numbers.

DETAILED DESCRIPTION

Description of Embodiments

Figure 1:
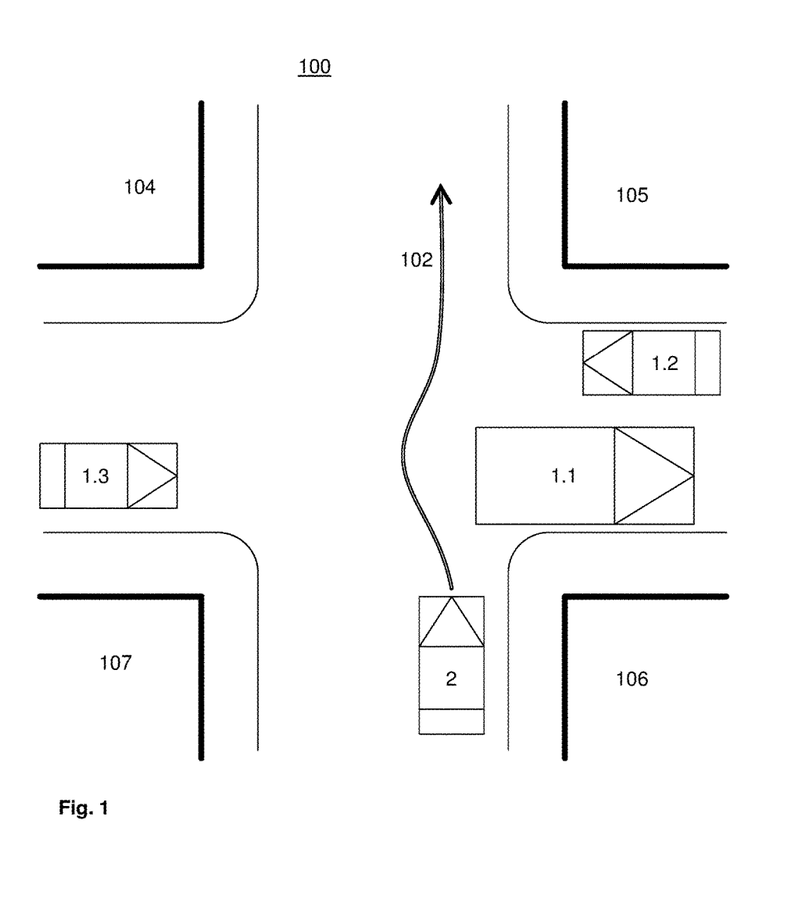
FIG. 1 shows a schematic depiction of a traffic space in the surroundings of a second motor vehicle.

FIG. 1 shows a schematic depiction of a traffic space 100 in the surroundings of a second motor vehicle 2. The present traffic space is a junction between two roads, with the general right-of-way rule of "right before left" applying. There are several other vehicles in the present traffic space, and at the corners of the junction there are buildings 104-107, indicated by the thicker boundary lines, with footpaths in front of them. The buildings 104-107 and a large vehicle 1.1 that has stopped in a road branching off to the right block part of the view of the traffic space for the driver of the second vehicle 2 and sensors mounted in the second vehicle 2. The planned route of the second motor vehicle 2 is indicated by the arrow 102. The driver of the second motor vehicle 2 should yield right of way to the vehicle 1.2 coming from the right before he himself can cross the junction.

Figure 2:
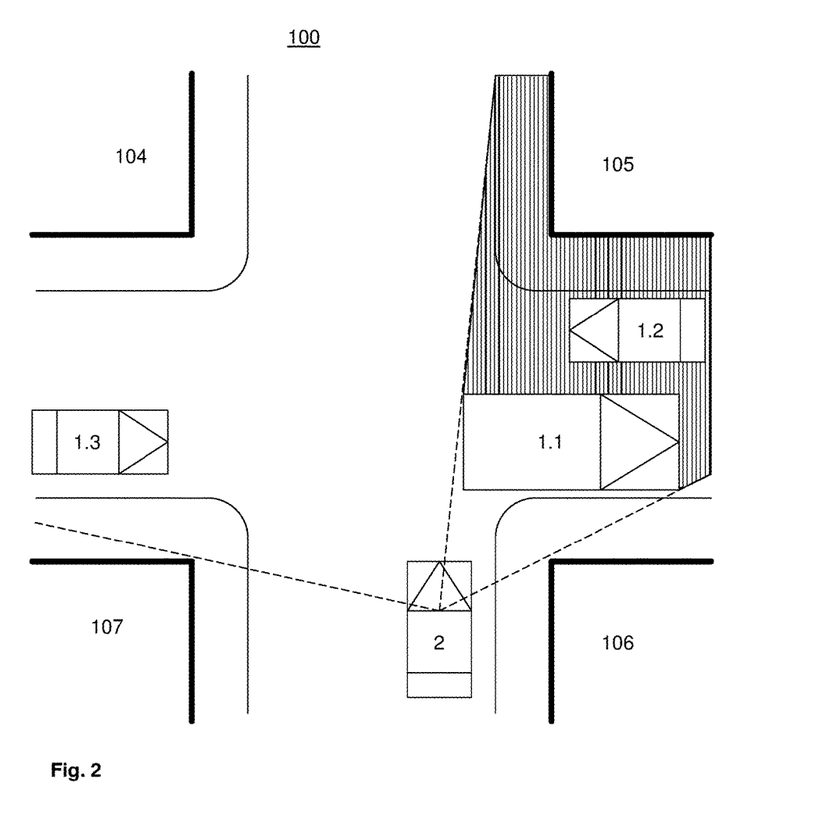
FIG. 2 depicts areas able to be picked up by the driver of the second motor vehicle or by sensors in the motor vehicle.

The areas able to be picked up by the driver of the second motor vehicle 2 or the areas able to be picked up by sensors in the motor vehicle are depicted in FIG. 2. For reasons of clarity, the coverage areas of the sensors and the visual range of the driver are assumed to be identical in the figures. The visual range of the driver is bounded on the left by the building 107. To the right, the visual range of the driver is bounded by the building 106. Additionally, the vehicle 1.1 blocks a large part of the view to the right. The part that the driver of the motor vehicle 2 cannot see is depicted by shading in the figure. It can clearly be seen that the view of the motor vehicle 1.2 is blocked by the motor vehicle 1.1. Were the driver of the motor vehicle 2 to continue his planned route, there is the risk of him seeing the motor vehicle 1.2 too late and a collision occurring.

Figure 3:
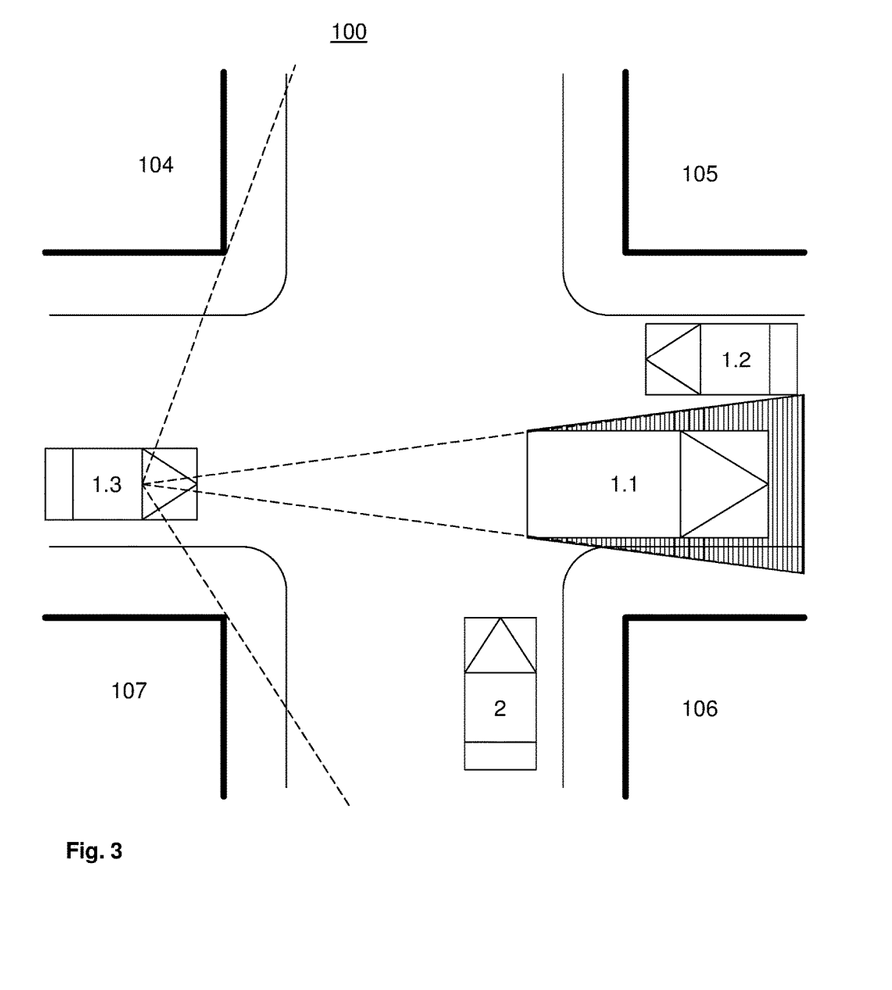
FIG. 3 shows the visual range of the driver of a first motor vehicle.

FIG. 3 depicts the visual range of the driver of the first motor vehicle 1.3. The visual range of the driver of the motor vehicle 1.3 is bounded to the left by the building 104 and to the right by the building 107. To the front, the vehicle 1.1 blocks a narrow area. As previously in FIG. 2, the area that the driver of the motor vehicle 1.3 cannot see is depicted by shading. The vehicle 1.2 is completely in the visual range of the driver of the vehicle 1.3.

Figure 4:
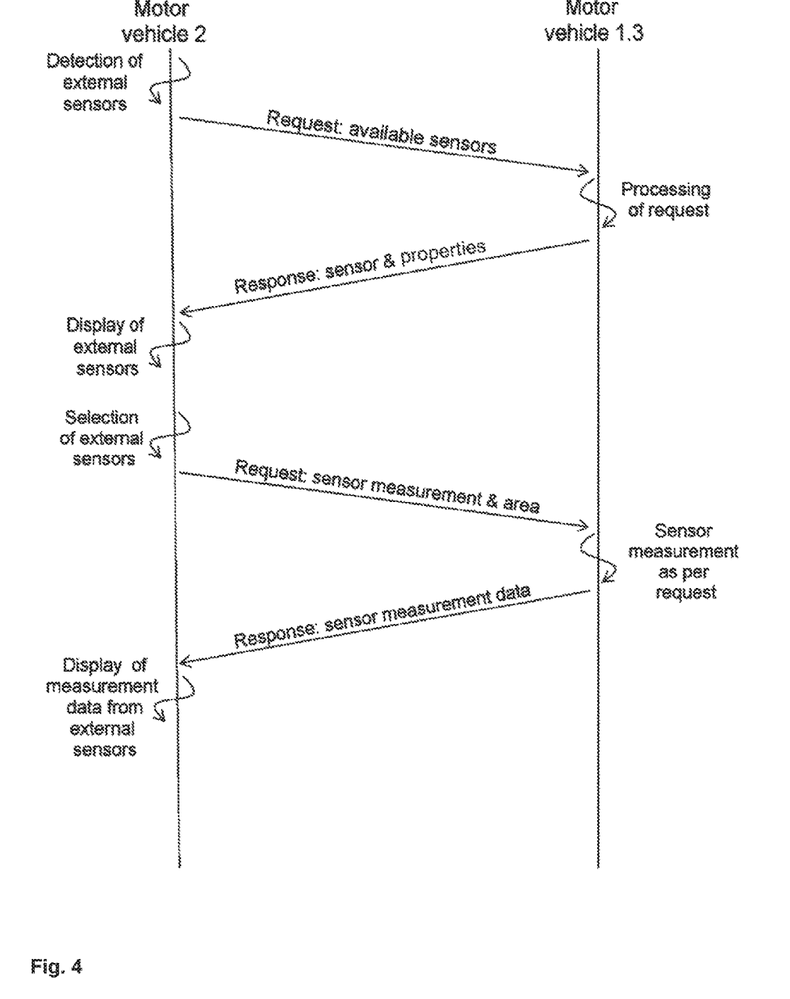
FIG. 4 shows an exemplary communication using the method according to the invention between a second and a first motor vehicle.

FIG. 4 depicts an exemplary communication using the method according to the invention between a second and a first motor vehicle for the traffic situation shown in FIGS. 1 to 3. The second motor vehicle 2 is equipped with an apparatus that searches the surroundings of the second motor vehicle 2 for external sensors whose measurement results can be displayed via a man-machine interface in the second motor vehicle. By way of example, the apparatus is a camera that searches the traffic space in front of the second motor vehicle 2 for other motor vehicles. In the example in FIGS. 1 to 3, the first motor vehicle 1.3 is picked up by the camera. In accordance with the method according to the invention, an apparatus provided in the second motor vehicle 2 sends a request to the first motor vehicle 1.3 concerning whether and if so which sensors can transmit their measurement results to the second motor vehicle 2. The request can be sent via a first point-to-point connection that is set up via a first communication interface. The first motor vehicle 1.3 receives and processes the request in an applicable apparatus. In the present example, the first motor vehicle 1.3 is likewise supposed to be equipped with a camera that picks up the traffic space in front of the first motor vehicle 1.3. The apparatus in the first motor vehicle 1.3 sends a response to the second motor vehicle 2 containing information pertaining to available sensors and the characteristics thereof. The characteristics of sensors comprise a coverage area, a vertical and/or horizontal swivel area, information about the spatial and/or temporal resolution and/or the range of the sensor and the like, for example. The response can be sent via the first point-to-point connection set up beforehand. The apparatus in the second motor vehicle 2 displays to the driver the available external sensors and optionally also the arrangement thereof in the traffic space and also the coverage areas of said sensors. The driver selects one or more external sensor(s) from which he would like to have measurement results displayed and optionally indicates which area of the traffic space is supposed to be picked up by means of the sensors. The apparatus in the second motor vehicle 2 sends an applicable request to the first motor vehicle 1.3, which performs an applicable sensor measurement and sends the sensor measurement data to the second motor vehicle 2. The man-machine interface in the second motor vehicle 2 displays the received and possibly further-processed sensor measurement data, so that the driver of the second motor vehicle 2 can obtain an overview of the traffic situation. The communication setup is not shown in this diagram. Further, authentication processes and error monitoring operations, although likewise at least optionally provided, are not shown.

Figure 5:
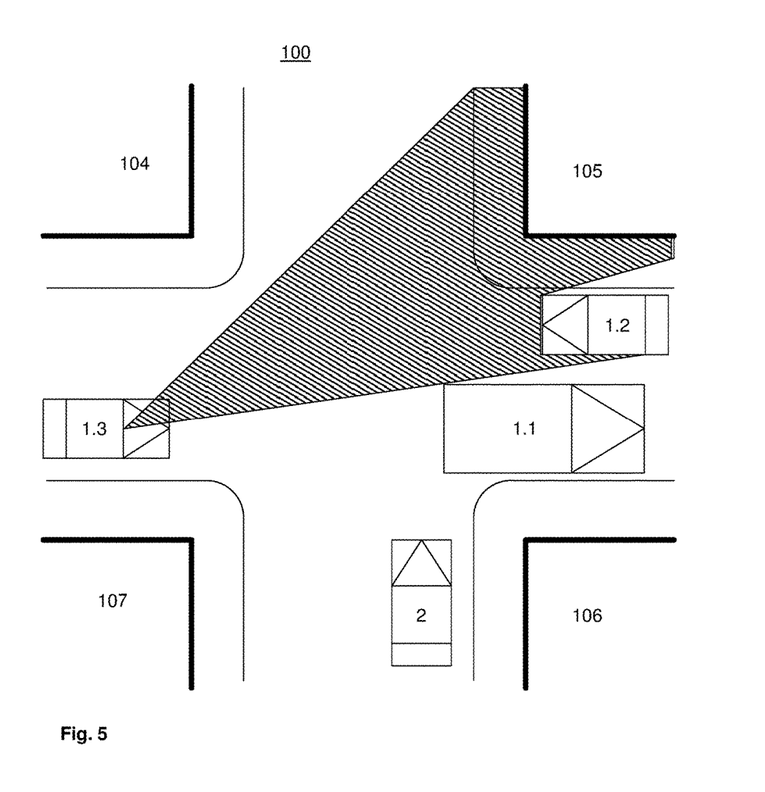
FIG. 5 shows an area picked up by the sensors of the first motor vehicle at the request of the second motor vehicle.

FIG. 5 shows the traffic space from FIGS. 1 to 3 and shows the area picked up by the sensors of the first motor vehicle 1.3 at the request of the second motor vehicle 2. The figure depicts the area picked up by the sensors of the first motor vehicle 1.3 by shading. It can clearly be seen that not all of the possible coverage area of the sensors of the first motor vehicle 1.3 is actually scanned. In particular the right-hand area from the point of view of the first motor vehicle 1.3 is not scanned, because this area can be seen clearly by the driver of the second motor vehicle 2. In the request for sensor measurement that the apparatus of the second motor vehicle 2 has sent to the first motor vehicle 1.3, the measurement area to be picked up has been specified accordingly.

In one embodiment of the present method, live camera images are sent from the first motor vehicle 1.3 to the second motor vehicle 2. If the sensor in the first motor vehicle 1.3 is not a camera, but rather a lidar system or a radar system, for example, then instead of the live camera images it is also possible for a piece of information about the existence of an object and the position thereof in the specified measurement area to be transmitted. If the apparatus in the first motor vehicle 1.3 has an applicable computer capacity and program code means, then a symbol that represents an object in the measurement area can also be generated from the measurement data. In this case, only the symbol and its position in the traffic space need to be transmitted. Depending on the sensor equipment, the position can be ascertained from images from a camera or from applicable measured values from a lidar system or radar system. The position can be described using a distance and direction relative to the first motor vehicle 1.3 in this case, or using absolute geoposition data ascertained therefrom, for example. A consideration of these processes in regard to ADASIS concepts is dispensed with at this juncture.

Figure 6:
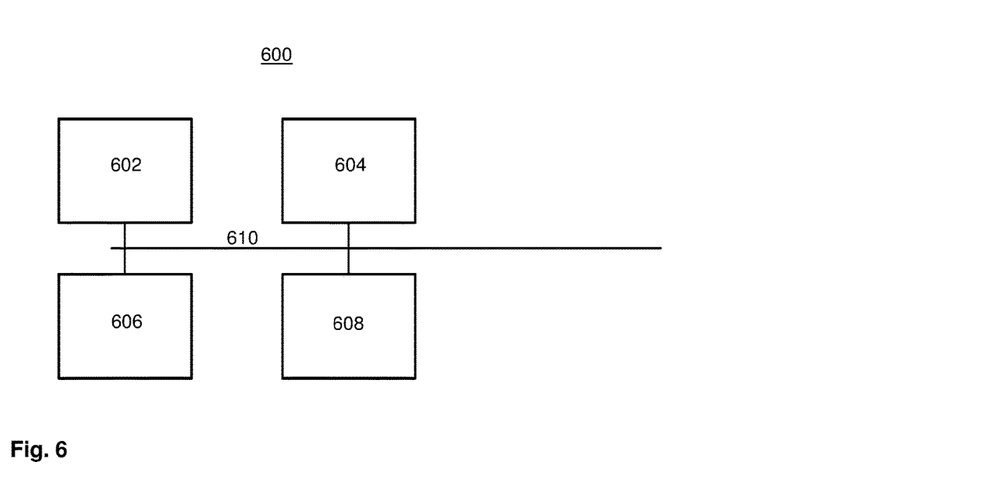
FIG. 6 shows a schematic exemplary block diagram of an apparatus in a first motor vehicle.

FIG. 6 shows a schematic exemplary block diagram of an apparatus 600 for carrying out the method according to the invention in a second motor vehicle. A sensor 602, a communication interface 604, a man-machine interface 606 and a controller 608 having a microprocessor and also volatile and nonvolatile memory means are connected to one another via one or more communication line(s) or communication bus(es) 610. Each of the components 602-606 may likewise have a microprocessor and also volatile and nonvolatile memory means. The microprocessor(s) execute(s) computer program instructions that cause the implementation of single or multiple steps of the method according to the invention. Optionally, there may be further components (not shown in the figure), for example a chip that performs a joint data fusion for local and remote sensor data, further a chip that uses the data from the sensor fusion chip to produce predictions for the behavior of the picked-up objects such as vehicles, pedestrians, etc., in particular including for those that cannot or intermittently cannot be picked up using the vehicle's own sensors, or a chip that combines the results of the prediction also using map data etc. in visually presentable data structures, e.g. for an output by augmented reality.

Figure 7:
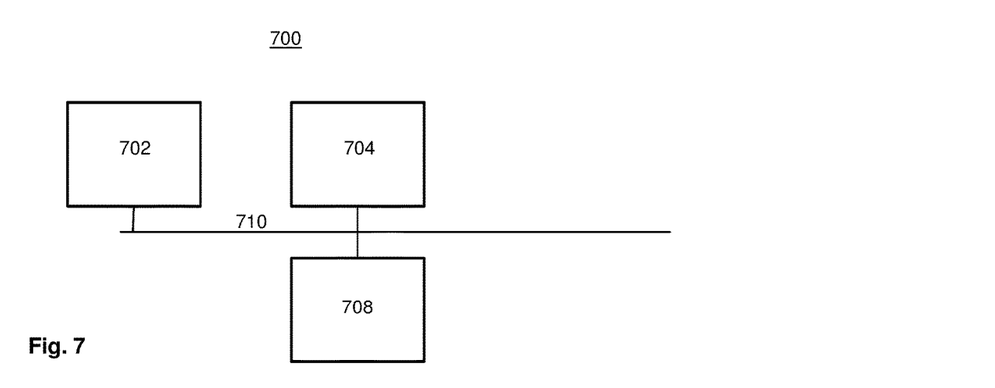
FIG. 7 shows a schematic exemplary block diagram of an apparatus in a second motor vehicle.

FIG. 7 shows a schematic exemplary block diagram with an apparatus 700 for carrying out the method according to the invention in a first motor vehicle. A sensor 702, a communication interface 704 and a controller 708 having a microprocessor and also volatile and nonvolatile memory means are connected to one another via one or more communication line(s) or communication bus(es) 710. Each of the components 702 or 704 may likewise have a microprocessor and also volatile and nonvolatile memory means. The microprocessor(s) execute(s) computer program functions that cause the implementation of single or multiple steps of the method according to the invention.

The invention claimed is:

1. A method for depicting sensor data of one or more first motor vehicle(s) via a man-machine interface of a second motor vehicle, comprising:

depicting an image of at least part of surroundings of the second motor vehicle via the man-machine interface of the second motor vehicle, wherein one or more first motor vehicle(s) is/are mapped at least in part, receiving a user input that corresponds to a selection of one or more of the first motor vehicles mapped on the image of the surroundings, setting up one or more individual first point-to-point connection(s) from the second motor vehicle to the selected first motor vehicle(s) via a first wireless communication interface, sending a request to the selected first motor vehicle(s) via the respective individual first point-to-point connection to transmit information pertaining to available sensors and the properties thereof to the second motor vehicle, receiving a plurality of responses from one or more of the selected first motor vehicles and reproducing a schematic depiction of the surroundings of the second motor vehicle, wherein the schematic depiction shows positions of the second motor vehicle and the one or more first motor vehicle(s) in the surroundings of the second motor vehicle, wherein the schematic depiction shows sensors available in the one or more first motor vehicle(s), and wherein the schematic depiction depicts areas within which the available sensors of the one or more first motor vehicle(s) and/or the sensors of the second motor vehicle can pick up objects, receiving a user input that corresponds to a selection of one or more of the sensors shown in the schematic depiction and of an area to be picked up by sensor, sending an applicable request to one or more first motor vehicle(s) whose sensors can pick up the area to be picked up, receiving applicable sensor data for a subsequent reproduction via the man-machine interface of the second motor vehicle, and wherein sensor data updated in response to an applicable request are received cyclically from one or more first motor vehicle(s) for a previously stipulated period or up until a call to stop a transmission.

2. The method as claimed in claim 1, wherein the one or more individual first point-to-point connection(s) is/are set up after applicable orientation of a first transmission or reception apparatus in the direction of the applicable selected one or more first motor vehicle(s).

3. The method as claimed in claim 2, wherein the first transmission or reception apparatus is oriented on the basis of angles of azimuth and elevation for the selected first motor vehicle(s) that are ascertained from the image of the surroundings of the second motor vehicle beforehand.

4. The method as claimed in claim 1, wherein the schematic depiction shows objects located in the surroundings of the second motor vehicle and/or in the respective surroundings of the one or more first motor vehicle(s).

5. The method as claimed in claim 1, wherein selected first motor vehicles that provide no response to the request are denoted in applicable fashion in the schematic depiction.

6. The method as claimed in claim 1, wherein the schematic depiction shows a bird's-eye view of the surroundings of the second motor vehicle.

7. The method as claimed in claim 1, wherein the sensor data represent information from a radar system, a lidar system, a video camera and/or an ultrasonic system.

8. The method as claimed in claim 1, comprising:

actuating respective radar systems in the second motor vehicle and the one or more first motor vehicle(s) to orient an area picked up by the radar system to the first or second motor vehicle by means of electronically controlled direction and aperture, sending the request and receiving the response to the request via the respective oriented radar systems.

9. An apparatus for depicting sensor data of one or more first motor vehicle(s) via a man-machine interface of a second motor vehicle, wherein the apparatus has a sensor, a communication interface, a man-machine interface and at least one controller that are connected to one another via one or more communication line(s) or communication bus(es), wherein the at least one controller has volatile and nonvolatile memory means, and wherein the apparatus is configured to, when the at least one controller (608) executes applicable computer program instructions stored in the nonvolatile memory means, carry out a method for depicting the sensor data of the one or more first motor vehicle(s) via the man-machine interface of the second motor vehicle, the method comprising:

depicting an image of at least part of surroundings of the second motor vehicle via the man-machine interface of the second motor vehicle, wherein one or more first motor vehicle(s) is/are mapped at least in part, receiving a user input that corresponds to a selection of one or more of the first motor vehicles mapped on the image of the surroundings, setting up one or more individual first point-to-point connection(s) from the second motor vehicle to the selected first motor vehicle(s) via a first wireless communication interface, sending a request to the selected first motor vehicle(s) via the respective individual first point-to-point connection to transmit information pertaining to available sensors and the properties thereof to the second motor vehicle, receiving a plurality of responses from one or more of the selected first motor vehicles and reproducing a schematic depiction of the surroundings of the second motor vehicle, wherein the schematic depiction shows positions of the second motor vehicle and the one or more first motor vehicle(s) in the surroundings of the second motor vehicle, wherein the schematic depiction shows sensors available in the one or more first motor vehicle(s), and wherein the schematic depiction depicts areas within which the available sensors of the one or more first motor vehicle(s) and/or the sensors of the second motor vehicle can pick up objects, receiving a user input that corresponds to a selection of one or more of the sensors shown in the schematic depiction and of an area to be picked up by sensor, sending an applicable request to one or more first motor vehicle(s) whose sensors can pick up the area to be picked up, receiving applicable sensor data for a subsequent reproduction via the man-machine interface of the second motor vehicle, and wherein sensor data updated in response to an applicable request are received cyclically from one or more first motor vehicle(s) for a previously stipulated period or up until a call to stop a transmission.

10. The apparatus as claimed in claim 9, wherein the one or more individual first point-to-point connection(s) is/are set up after applicable orientation of a first transmission or reception apparatus in the direction of the applicable selected one or more first motor vehicle(s).

11. The apparatus as claimed in claim 10, wherein the first transmission or reception apparatus is oriented on the basis of angles of azimuth and elevation for the selected first motor vehicle(s) that are ascertained from the image of the surroundings of the second motor vehicle beforehand.

12. The apparatus as claimed in claim 9, wherein the schematic depiction shows objects located in the surroundings of the second motor vehicle and/or in the respective surroundings of the one or more first motor vehicle(s).

13. The apparatus as claimed in claim 9, wherein selected first motor vehicles that provide no response to the request are denoted in applicable fashion in the schematic depiction.

14. The apparatus as claimed in claim 9, wherein the schematic depiction shows a bird's-eye view of the surroundings of the second motor vehicle.

15. The apparatus as claimed in claim 9, wherein the sensor data represent information from a radar system, a lidar system, a video camera and/or an ultrasonic system.

16. The apparatus as claimed in claim 9, comprising:

actuating respective radar systems in the second motor vehicle and the one or more first motor vehicle(s) to orient an area picked up by the radar system to the first or second motor vehicle by means of electronically controlled direction and aperture, sending the request and receiving the response to the request via the respective oriented radar systems.

17. A motor vehicle having an apparatus for depicting sensor data of one or more first motor vehicle(s) via a man-machine interface of a second motor vehicle, wherein the apparatus has a sensor, a communication interface, a man-machine interface and at least one controller that are connected to one another via one or more communication line(s) or communication bus(es), wherein the at least one controller has volatile and nonvolatile memory means, and wherein the apparatus is configured to, when the at least one controller executes applicable computer program instructions stored in the nonvolatile memory means, carry out a method for depicting the sensor data of the one or more first motor vehicle(s) via the man-machine interface of the second motor vehicle, the method comprising:

depicting an image of at least part of surroundings of the second motor vehicle via the man-machine interface of the second motor vehicle, wherein one or more first motor vehicle(s) is/are mapped at least in part, receiving a user input that corresponds to a selection of one or more of the first motor vehicles mapped on the image of the surroundings, setting up one or more individual first point-to-point connection(s) from the second motor vehicle to the selected first motor vehicle(s) via a first wireless communication interface, sending a request to the selected first motor vehicle(s) via the respective individual first point-to-point connection to transmit information pertaining to available sensors and the properties thereof to the second motor vehicle, receiving a plurality of responses from one or more of the selected first motor vehicles and reproducing a schematic depiction of the surroundings of the second motor vehicle, wherein the schematic depiction shows positions of the second motor vehicle and the one or more first motor vehicle(s) in the surroundings of the second motor vehicle, wherein the schematic depiction shows sensors available in the one or more first motor vehicle(s), and wherein the schematic depiction depicts areas within which the available sensors of the one or more first motor vehicle(s) and/or the sensors of the second motor vehicle can pick up objects, receiving a user input that corresponds to a selection of one or more of the sensors shown in the schematic depiction and of an area to be picked up by sensor, sending an applicable request to one or more first motor vehicle(s) whose sensors can pick up the area to be picked up, receiving applicable sensor data for a subsequent reproduction via the man-machine interface of the second motor vehicle, and actuating respective radar systems in the second motor vehicle and the one or more first motor vehicle(s) to orient an area picked up by the radar system to the first or second motor vehicle by means of electronically controlled direction and aperture, and sending the request and receiving the response to the request via the respective oriented radar systems.

18. The motor vehicle as claimed in claim 17, wherein the one or more individual first point-to-point connection(s) is/are set up after applicable orientation of a first transmission or reception apparatus in the direction of the applicable selected one or more first motor vehicle(s).

* * * * *